United States Patent [19]

Powell et al.

[11] Patent Number: 4,552,683

[45] Date of Patent: Nov. 12, 1985

[54] GAS DESULFURIZATION REACTANT

[75] Inventors: Byron E. Powell, Rolling Meadows; Virendar S. Bakhshi, Chicago; Donald A. Randolph, Wheaton, all of Ill.

[73] Assignee: United States Gypsum Company, Chicago, Ill.

[21] Appl. No.: 532,086

[22] Filed: Sep. 14, 1983

Related U.S. Application Data

[62] Division of Ser. No. 426,445, Sep. 29, 1982, Pat. No. 4,424,197.

[51] Int. Cl.$^4$ .......................... C09K 3/00; B01J 8/00; C01B 17/00
[52] U.S. Cl. ................................. 252/189; 423/244; 423/635
[58] Field of Search .............. 423/244 A, 244 R, 635, 423/636, 555; 252/189, 192, 190

[56] References Cited

U.S. PATENT DOCUMENTS 3,718,453  9/1955  Beckman ........................... 423/244
3,781,408 12/1973  Lin .................................... 423/555

OTHER PUBLICATIONS

Boynton, *Chemistry and Technology of Lime and Limestone*, 1966, pp. 146–147.
Chemical Abstracts: vol. 85, 112304, 1976.

*Primary Examiner*—Gregory A. Heller
*Attorney, Agent, or Firm*—Kenneth E. Roberts; Robert H. Robinson; Robert M. Didrick

[57] ABSTRACT

A process for adsorbing sulfur dioxide from a gas comprising contacting a gas containing $SO_2$, such as a flue gas, with about stoichiometric amounts of a specially prepared calcium oxide so that substantially all of the sulfur dioxide content is reacted throughout the calcium oxide particle to form a calcium sulfate reaction product. The useful calcium oxide particles comprise a highly voided skeletal structure of very large surface area and large pore volume with numerous macro pores. Such particles are obtained by flash calcining sand-size grains of calcium carbonate, such as aragonite, calcite or dolomite.

8 Claims, 6 Drawing Figures

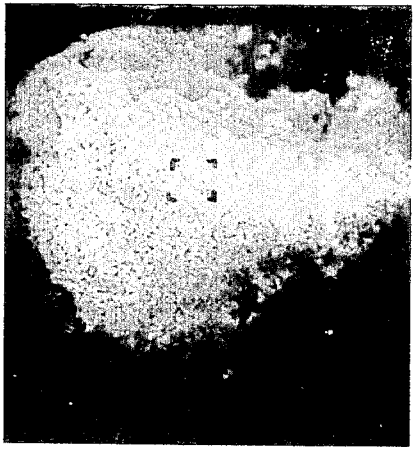
Fig. 2a  Lime No. 1    500X
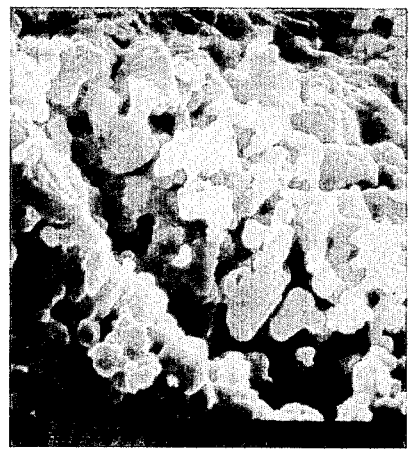
Fig. 2b  Lime No. 1    5000X
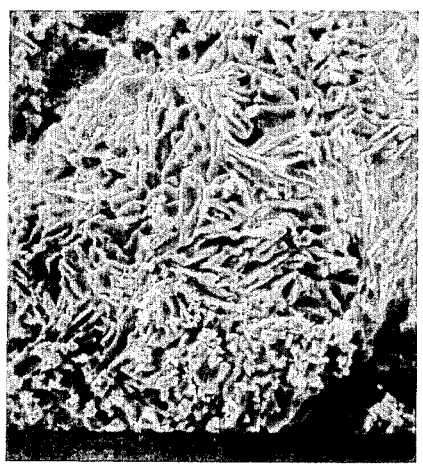
Fig. 2c  Partially Spent Lime No. 1    500X
Fig. 2d  Partially Spent Lime No. 1    5000X

GAS DESULFURIZATION REACTANT

BACKGROUND OF THE INVENTION

1. Field of the Invention

This application is a divisional of application Ser. No. 426,445, filed Sept. 29, 1982, now U.S. Pat. No. 4,424,197.

The present invention relates to the art of stack gas scrubbing, and more particularly, to reactants useful in dry flue gas desulfurization utilizing a bed of lime (calcium oxide, CaO).

In the burning of industrial fuels, for example in a boiler, the products of combustion include undesirable sulfur compounds, mostly sulfur dioxide. These gaseous sulfur compounds contaminate the atmosphere and in order to prevent air pollution such compounds should be separated from the combustion products before release to the atmosphere. In a typical flue gas desulfurization process, the flue gases are passed through a scrubbing medium which selectively removes a substantial amount of the sulfur oxides from the gas stream.

One of the general ways to accomplish this is by a wet process wherein the gas is caused to pass through water containing a reactant in solution or suspension. The wet lime and limestone processes in wide use today have been plagued with mechanical problems and economic insufficiencies. The processes are very wasteful with respect to water, requiring vast settling ponds for waste sludge. They are also inefficient with respect to the scrubbing medium, utilizing only about 65% of the available limestone in the scrubbing process. Mechanical problems encountered in the wet processes include corrosion, erosion, silting, plugging, scaling and other mechanical failures.

Efforts to eliminate the problems of wet scrubbing systems have led to the development of dry processes wherein the gas contacts a finely divided solid reactant. These proposed dry processes have drawbacks in requiring inter alia pretreatment of the stack gas with additional, and expensive, additives such as steam and oxidation catalysts and additional equipment such as catalytic converters. Further, the desulfurization efficiency is low and the conversion of the reactants remains far from complete. The spent reactants must later on be submitted to regeneration or conversion treatments so as to obtain by-products of possible value.

2. Description of the Prior Art

In U.S. Pat. Nos. 3,781,408 and 3,861,930 there are disclosed a dry flue gas desulfurization system of first passing the flue gases through a catalytic reactor to oxidatively convert the $SO_2$ content to $SO_3$ and then passing the $SO_3$ through a fluidized bed of specially sized CaO particles present in excess over the stoichiometric requirement, to convert the $SO_3$ to $CaSO_4$, which forms a calcium sulfate shell over the core of the CaO particles. There is a suggestion that porous CaO may be used, and the surface of the porous CaO particles would be converted into a $CaSO_4$ reaction product. In both cases the particle is said to have only CaO in the core with $CaSO_4$ films on the surface of unreacted CaO particles. The spent reactants are said to be useful in making various industrial products that can utilize the combination of unreacted CaO core and outer $CaSO_4$ coating.

Dilworth, U.S. Pat. No. 4,277,450, discloses a dry flue gas desulfurization system in which a fresh, very finely divided (e.g., at least 4000 $cm^2/g$ Blaine) limestone is rapidly calcined to an even smaller powder of soft burned lime and fed to a desulfurization zone in an amount at least nine times stoichiometric for mixing with the emission gas in turbulent gaseous suspension.

In Thornton, U.S. Pat. No. 3,475,121, there is described a process in which finely divided CaO is injected into a flue gas in an amount at least 1.5 times greater than the stoichiometric amount for the $SO_2$ in the flue gas to react with the sulfur dioxide to produce calcium sulfide which is then separated from the gas, as by a cyclone separator. Thereafter, the sulfide is decomposed in a fluidized bed to regenerate the CaO reactant.

SUMMARY OF THE INVENTION

Virtually stoichiometric conversion of flue gas $SO_2$ and CaO can be accomplished at temperatures from about 500° C. to about 1000° C. with a calcium oxide reactant particle provided with a tremendous number of macro pores and very large total pore surface area to weight ratio. The present invention involved finding the difficulties with prior lime reactants and providing a means for virtually total utilization of the lime in stoichiometric amounts. Prior dead burned calcium oxides do not have the porosity necessary to avoid the formation of a calcium sulfate coating. Prior soft burned porous lime reactants are characterized in that a large part of their surface area is in large cavities having smooth sides or very fine pores too small for the $SO_2$ molecule to penetrate. We have now found that virtually stoichiometric reaction may be accomplished in porous CaO particles that have pores ranging from about 0.2 micrometers to about 20 micrometers in diameter for at least about ½ of their pore volume. It is preferred that about 50% of the surface area of the particle be provided by pores of about 2 micrometers to about 0.4 micrometers diameter. Such particles are obtained by flash calcining sandsize grains of calcium carbonate, such as a marine origin aragonite sand, which yields skeletal lime particles.

BRIEF DESCRIPTION OF THE DRAWINGS

FIGS. 2a–d are scanning electron microphotographs of a portion of a lime particle of the invention.

DESCRIPTION OF THE PREFERRED EMBODIMENTS

Figure 1:
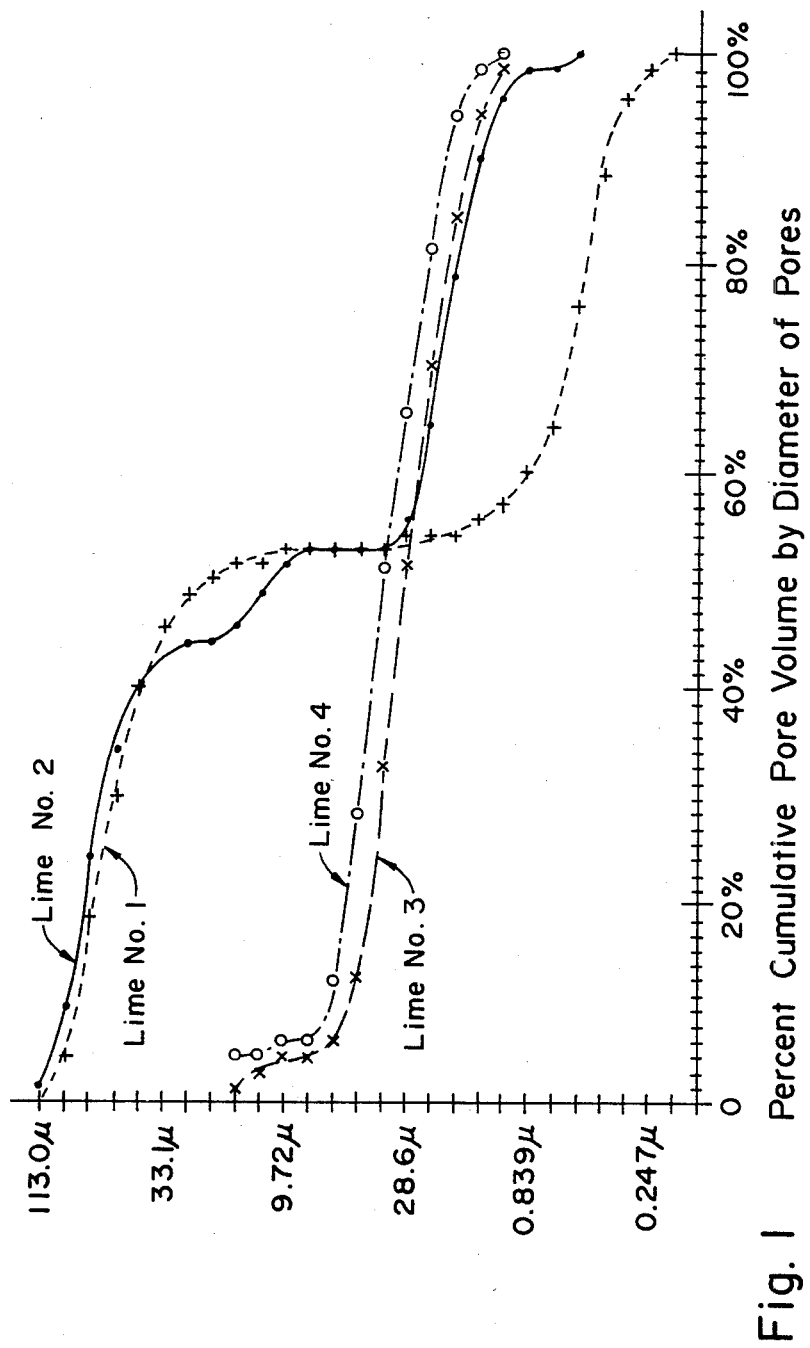
FIG. 1 shows cumulative pore volumes versus pore diameters for three different limes.

Broadly speaking, the process of this invention comprises reacting flue gas, such as from a coal-burning power plant with a bed of highly voided skeletal lime particles to react substantially all of the $SO_2$ content of the gas throughout the lime particle forming a $CaSO_4$ reaction product. Generally, flue gas from power plants burning coal of about 3% sulfur content contains about 0.2% $SO_2$ gas. Typically, this gas passes through a solids separator, e.g. bag house, mechanical particle collectors such as cyclones, or electrostatic precipitators, for removal of fly ash and the like. Prior to the solids separator, the gas may have a temperature of from 932° F. (500° C.) to 1832° F. (1000° C.). As the gas leaves the separator, it is usually at a temperature of about 300° F. (149° C.)–1000° F. (538° C.). Most prior methods of desulfurization are inefficient at the lower and the upper portion of these temperature ranges. The method of this invention is particularly applicable to flue gas obtained from the burning of fossil fuel such as for example, petroleum or petroleum based products, coal, coke and the like in which the flue gas generally has an exit temperature ranging from about 500° C. to about 1000° C.

In the process in general, the flue gas may contain from 0.01% to 3.0% $SO_2$. The flue gas containing the $SO_2$ is passed through a reactor containing the skeletal lime. The flue gas may optimally be introduced at temperatures between about 500° and 1000° C. (and preferably 800°–850° C.) and mixed with the skeletal lime for conversion of the $SO_2$ content to calcium sulfate. The reactor bed may be any convenient form of fluidized beds or packed column reactors. The exhausting flue gas, scrubbed of $SO_2$ may then be passed through a solids separator to separate some solids such as fly ash, as by passing through a cyclone separator, bag filter or electric precipitator.

On exhaustion of the skeletal lime particles in the bed, the bed is replenished and the reacted particles, now completely converted to calcium sulfate are readily ground to appropriate sizes and used as fillers in the preparation of various industrial products, including fillers for various plastics such as polypropylene, or for calcium sulfate joint compound for use in the filling of joints between panels of gypsum wallboard and the like.

Because of the completeness of conversion, the lime particles continue to be useful for substantially longer periods of time than has been heretofore capable with only calcium sulfate on the surface. Thus it has been found that virtually the full stoichiometric capacity for the chemical reaction with sulfur dioxide can be utilized. In part, this is due to the fact that numerous pores in the range of about 0.2 to 20 micrometers in diameter are provided in the skeletal particle. Specifically, with prior systems employing calcium oxide as an adsorbing medium for sulfur dioxide in a dry system, the rate of feed of lime, by weight, was maintained at about 1½ to 9 times the weight of the sulfur dioxide; whereas with the method and reactant of the present invention fresh calcium oxide particles can be fed at such a rate that the ratio of the CaO content of the material to sulfur dioxide, by weight, is on the order of 1:1. It has been found that a simulated flue gas stream containing from about 0.01% to about 3.0% of sulfur dioxide can be cleaned to a level of about 2 ppm $SO_2$ as measured at the outlet.

According to the present invention, it has been found that the CaO pores must be the right size and the right volume distribution in the particle in order to obtain stoichiometric conversion. It is important for reaction throughout the particle that pores be present substantially in a range of at least about 0.2 micrometers to about 20 micrometers. Smaller pore diameters will rapidly fill up and plug off quickly with reacted $SO_2$. Pore diameters substantially larger than 20 microns are so large that surface area effectiveness for $SO_2$ adsorption is lost unless the walls of such voids are provided with numerous smaller pores for $SO_2$ penetration. It has been found according to the present invention that calcium oxide particles derived from flash calcination will provide the necessary highly voided skeletal structure in a highly preferred range. The particles have a total pore volume to weight ratio as measured by mercury porosimetry of at least 0.5 cubic centimeters per gram (preferably about 0.7–0.9 cc/g) and total surface area to weight ratio as measured by mercury porosimetry of at least 0.7 square meters per gram (preferably about 0.9–4 $m^2/g$) with the median pore diameter by pore volume in micrometers of at least greater than 0.8 and median pore diameter by surface area of not more than 2 micrometers.

The calcined particle has the appearance of a spidery network of channels (very large pores) with their membrane walls full of smaller pores (macro pores in contrast to tiny pores) which, for convenience, is referred to hereinafter as a "highly voided or skeletal" lime or calcium oxide structure. Such calcium oxide particles may also be characterized as having large total pore volumes to weight ratios and total surface areas to weight ratios; and further preferred are those in which at least about half the pore volume is accounted for by a few large pores and numerous smaller pores whereby the median pore diameter, by volume, is greater than 0.8 micrometers and by surface area is less than 2 micrometers. In other words, ½ the surface area of the openings in the particle's surface resides in pores that are less than ½ micrometer in diameter yet ½ the volume of the openings resides in pores larger than 1.2 micrometer in diameter e.g. 4–20 micrometers as shown in the appended drawings, particularly FIGS. 1 and 2b.

Such highly voided skeletal structure CaO particles are derived by flash calcination in a matter of less than 30 seconds (generally less than 10 and preferably about 1–3 seconds) of calcium carbonate materials at temperatures ranging from 900° C. to 1600° C. (preferably about 1000° C.–1300° C.). Longer total residence times that include up to 15 minutes substantial low temperature pre- or post-heating will still provide minimum satisfactory materials. Appropriate feed materials may be any high purity calcium carbonate particle having a particle size of about 106 micrometers to about 2–3.5 millimeters diameter. Suitable calcium carbonate source materials may be aragonite mineral, calcite mineral such as high calcium limestone, dolomitic mineral such as dolomitic limestone, and the like. The particles of the invention appear to derive their unusual properties from the formation of massive channeling and small openings or macropores, by the rapid release of $CO_2$ gas from the $CaCO_3$. As the heat is applied in flash calcination for only a few seconds, the surface of the skeletal particle formed by the rapid release of $CO_2$ gas does not anneal and form a hard glaze or crust of dead burnt CaO. Instead, it forms a soft burned CaO as a maze of channels as shown in FIGS. 2b and d. This particle does not have to be finely pulverized to make it highly reactive. The flash calciner may be gas, coal or oil fired, though preferably gas fired for sands having a maximum particle size of about 2.35 millimeters and operated at 1250°–1350° C.

For a more complete understanding of the invention the following examples run on pilot equipment are provided.

EXAMPLE 1

Preparation of Lime Particles

Two different highly skeletal lime materials (Lime #1 and #2) were prepared by flash calcining "glass grade" aragonite sand particles. Analysis of the aragonite feed is set forth in Table 1. The sand was fed at a rate of 1100 pounds per hour to a flash calcination furnace fired either with natural gas or coal. Lime #1 was prepared by operating the furnace with gas at 1250° C. and providing a 5 seconds average residence time for the calcining particles in the furnace. Lime #2 was prepared in the same manner but the furnace was coal fired, and the calcined material was post heated at 1200° C. for 15 minutes for a material of the invention with fewer large cavities and minimum skeletal structure. Physical properties and chemical analysis of these limes compared to conventional porous quick limes (Lime #3 is a high active porous soft burned CaO and Lime #4 is a less chemically active hard burned porous CaO) is set forth in Tables 1 and 2.

Table 1 shows that conventional Lime #3 has the greatest surface area and should therefore have the greatest contact area for sulfate conversion on exposure to $SO_2$ gas. However, the mercury porosimetry data in Table 2 shows that Lime #1 has immensely greater total pore area and greater total pore volume. The reason for this may be seen in FIGS. 1 and 2 and Table 2. FIG. 2a is a scanning electron microphotograph of a particle of Lime #1. Increasing the magnification, in FIG. 2b, reveals the skeletal network of channels and macro pores in a thin walled network of solid material.

The configuration shown in FIG. 2b is quantified in the mercury porosimetry data of Table 2 and the cumulative pore volume per pore diameter data of FIG. 1. Table 2 shows that the limes of the invention have very small median pore diameters as determined by surface area yet very large median pore diameters as determined by pore volumes. FIG. 1 shows the distribution, with the X scale being logarithmic. FIG. 1 shows that the first about 20% of the cumulative pore volume of Limes 1 and 2 is contained in pores having diameters between 113 and about 100 micrometers and the first 50% is reached in pores having diameters greater than 20 micrometers whereas the conventional CaO limes 3 and 4 do not have any pore volume in pores larger than 20 micrometers. However, the fact that Lime #1 has a median pore diameter by area of less than 0.5 micrometers (Table 2) and its average pore diameter is about 1 micrometer (Table 2) coupled with the fact that about the last 40% of cumulative pore volume is contained in pores with pore diameters less than 1 micrometer means that there is an extremely large number of macro proes (>0.02 and <2 micrometers).

TABLE 1

| Feed Material - Chemical & Sieve Analysis | | | |
|---|---|---|---|
| Chemical Analysis | | Sieve Analysis % retained on | |
| 54.57% | CaO | 0.7% on | 14 mesh |
| 0.32 | MgO | 2.4 | 20 |
| 0.05 | SiO2 | 4.4 | 28 |
| 0.03 | Fe2O3 | 7.7 | 35 |
| 0.05 | Al2O3 | 19.7 | 48 |
| 0.33 | SO3 | 27.9 | 65 |
| 44.15 | Loss on Ignition (LOI) | 27.5 | 100 |
| | | 6.9 | 150 |
| | | 1.4 | 200 |
| | | 0.8 | 325 |
| | | 0.6 | passing 325 mesh |

| Calcined Material-Physical Analysis | | | | |
|---|---|---|---|---|
| Screen Size | Lime #1 | Lime #2 | Lime #3 | Lime #4 |
| % Retained on | | | | |
| 30 mesh (590 microns) | 3.8% | 0.3% | — | — |
| 50 mesh (297 microns) | 16.6 | 1.0% | — | — |
| 100 mesh (149 microns) | 44.9 | 7.0 | — | — |
| 140 mesh (105 microns) | 12.7 | 3.0 | — | — |
| 325 mesh (44 microns) | 7.7 | 10.8 | — | — |
| passing 325 mesh (44 microns) | 7.6 | 74.3 | — | — |
| Surface Area BET-Nitrogen cm²/g | 16,300 | 5,700 | 28,960 | 3,900 |
| C-value | 121 | 56 | 42 | 43 |
| Hysterisis loops (indicating .002-.02 micro pores) | None | None | None | None |

| Calcined Material Chemical Analysis | | | |
|---|---|---|---|
| Constituent | Lime #1 | Lime #2 | Lime #3 |
| % CaO | 97.50 | 97.20 | 96.50 |
| % MgO | 0.38 | 0.38 | 0.18 |
| % SiO2 | 0.09 | 0.27 | 1.00 |
| % Fe2O3 | 0.02 | 0.10 | 0.17 |
| % Al2O3 | 0.03 | 0.20 | |
| % SO3 | 0.30 | 0.70 | 0.13 |
| ppm Cl | 100 | 100 | — |
| % LOI | 0.31 | 0.24 | 0.75 |
| Available Lime as CaO by ASTM C25 | 98.0 | 96.5 | 95.0 |
| Slaking Index Temperature Rise Change in °C. | 30.0 60° C./ 2 minutes | 4.9 53° C./ 2 minutes | 25° C. total |

TABLE 2

| Physical Analysis - Porosimetry | | | | |
|---|---|---|---|---|
| | Lime #1 | Lime #2 | Lime #3 | Lime #4 |
| Total Pore Volume (cc/g) | 0.8792 | 0.7145 | 0.1338 | .3078 |
| Total Pore Area (m²/g) | 3.3806 | 0.9443 | 0.2399 | .3908 |
| Median pore diameter: | | | | |
| by pore area (mm) | 0.4524 | 1.5719 | 2.0565 | 2.6883 |
| by pore volume (mm) | 20.7535 | 11.4660 | 2.9264 | 3.7049 |
| Average pore diameter (4 vol/area) | 1.0403 | 3.0263 | 2.2299 | 3.1503 |
| Bulk Density (g/cc) | 0.8828 | 1.0002 | 1.3364 | 1.4213 |
| Apparent Density adjusted for pore vol. measured at maximum "Hg" pressure (g/cc) | 2.9752 | 3.5045 | 1.6273 | 2.5267 |

This shows that Lime #1 is composed of channels of very thin membraned walls that are full of macro pores large enough for $SO_2$ gas to penetrate and react throughout the network. It is believed that skewing the pore size and volume distribution obtained by flash calcining allows the $SO_2$ to flow through the channels and react with CaO in all of the pore volume of Limes #1 and #2. Thus, there is much more available pore volume than can be filled by the formation of $CaSO_4$, which has a larger molar volume (45.9 cm³/gram molecular weight) than CaO (16.9 cm³/gram molecular weight), due to the macro pore distribution provided by this invention.

EXAMPLE 2

Gas Desulfurization

Figure 3:
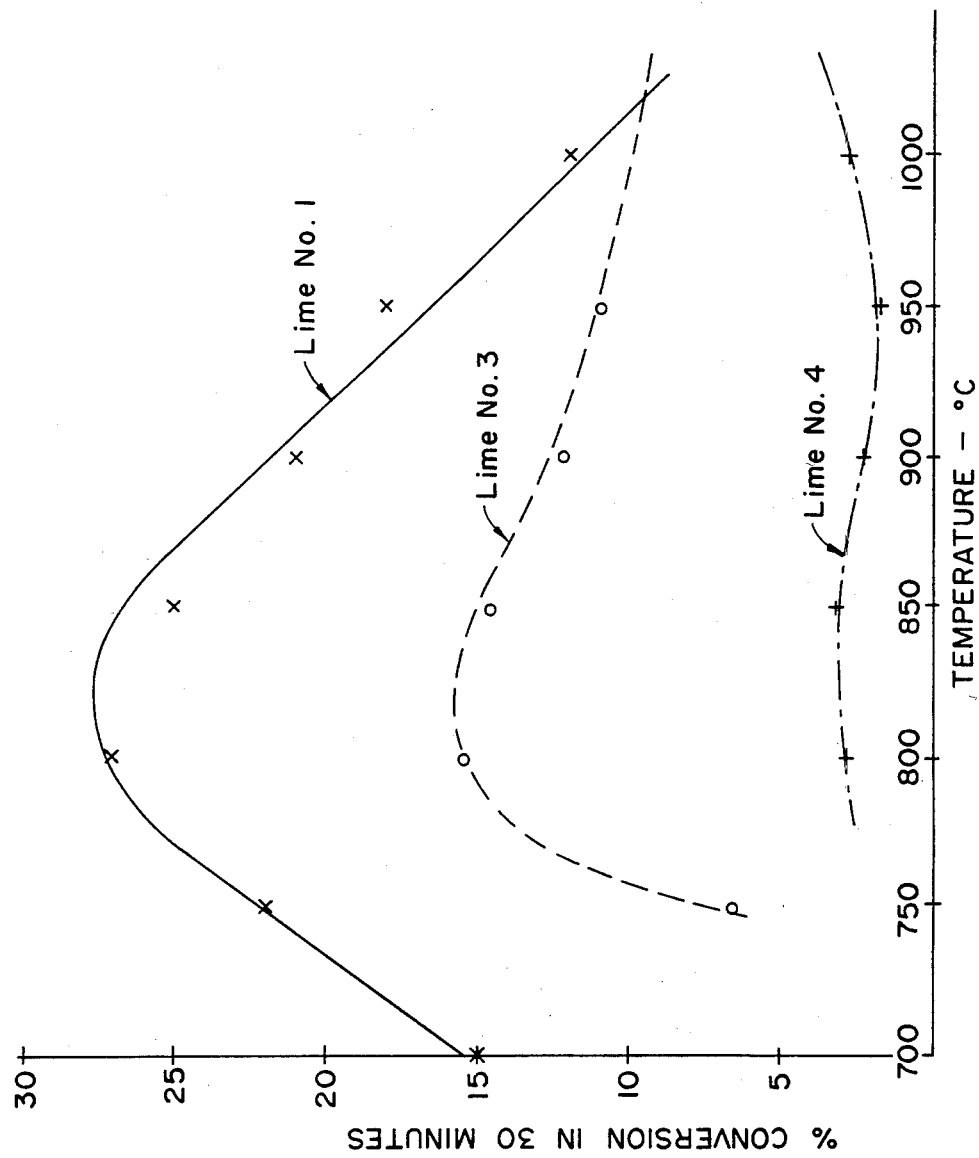
FIG. 3 is a plot of percentage conversion from calcium oxide to calcium sulfate versus different temperatures for three different limes.

In a first series of experimental evaluations, Lime #1 and Lime #3 were compared for levels of conversion of CaO to $CaSO_4$ in a small, packed bed differential reactor. The reactor assembly was maintained at various controlled temperatures in a tube furnace and exposed to 3-4% SO₂ simulated flue gas for one-half hour exposures at each temperature. Results are set forth in FIG. 3 and show that between 750° C. and about 900° C. Lime #1 of the invention underwent greater than twice the amount of CaO conversion to CaSO₄ as the conventional Lime #3. Scanning electron microphotographs of exposed material from Lime #1, FIGS. 2c and 2d, show growth of calcium sulfate anhydrite structure throughout the entire particle without sealing off and blocking of passageways. Sulfur and calcium maps under the scanning electron microscopic equipment showed that the sulfur had penetrated throughout the reactant particles. This indicates favorable pore distribution for diffusion of the SO₂ molecule throughout the particles without the outside surfaces being sealed off from gas penetration by the CaSO₄. Further tests gave conversions of both Lime #1 and Lime #2 between 60 and 80% at 2 hour exposures and established 800°-850° C. as the optimum reaction temperature range for 30-60% conversions at the 3-4% SO₂ content.

In a second series of comparative evaluations, fresh samples of Lime #1 and Lime #3 were prepared and submitted to reactivity analysis for sulfur capture by an independent testing facility. Multipoint BET and mercury porosimetry surface area measurements were taken of the limes. The limes were exposed to simulated flue gas mixtures for short periods of time in a thin bed differential reactor to determine early reactivity rates. In the reactor, 100 mg samples were exposed at temperatures of 740°, 845° and 945° C. to a wet reactant gas stream mixtures of 2000-4000 ppm SO₂, 2-5% O₂, 12% CO₂, 2% H₂O and the balance N₂ at a velocity of 34 cm per second STP.

Based on conventional calculations using models of porous solid materials and the surface area measurements, it was predicted that the maximum amount of CaO that would be consumed, or spent in reaction with SO₂, for Lime #1 would be 64%. In the evaluations actual conversions attained 76% consumption of the CaO in Lime #1 in 15 minutes (Table 3).

In the battery of tests in this second evaluation Lime #1 was from 1.4 to 2.5 times more reactive than Lime #3. A review of the plots of relative occurrences of pores as a function of pore diameter for these two lime samples provided evidence that in Lime #1 nearly all the measured BET surface area was in pores between 5 and 0.2 micrometers in diameter. In contrast, only 53% of the total measured BET surface area in Lime #3 was within that range of diameter. It should be noted that while this evaluation did not attempt to determine pore distribution with exactitude, it is still significant that a relatively narrow distribution appears responsible for the overall higher reactivity of Lime #1.

TABLE 3

| Exposure (Seconds) at 845° C. | Sulfur Capture | | | |
|---|---|---|---|---|
| | Lime #3 | | Lime #1 | |
| | mg SO₃ 100 mg sample | % sample consumed | mg SO₃ 100 mg sample | % sample consumed |
| 16 | 5.90 | 4.13 | 11.0 | 7.71 |
| 30 | 8.86 | 6.21 | 15.3 | 10.7 |
| 60 | 13.3 | 9.3 | 28.7 | 20.1 |
| 100 | 14.5 | 10.2 | 50.3 | 35.2 |
| 900 | 44.9 | 31.4 | 109.0 | 76.5 |

What is claimed is:

1. A reactant for flue gas desulfurization comprising calcium oxide particles of bulk density less than 1 gram per cc, total pore volume of at least about 0.4 cubic centimeters per gram, total pore area of at least 1 square meter per gram, median pore diameter by surface area of less than 2 micrometers, median pore diameter by pore volume of at least 0.8 micrometers and apparent skeletal density of at least about 2.7.

2. The reactant of claim 1 in which the calcium oxide particles comprise flash calcined marine origin aragonite sand particles.

3. The reactant of claim 1 in which at least about half of the pore volume resides in pores ranging from about 0.2 micrometers to about 20 micrometers in diameter.

4. The reactant of claim 1 in which at least about half of the surface area is provided by pores of about 2 micrometers to about 0.4 micrometers in diameters.

5. The reactant of claim 1 having a total pore volume to weight ratio of about 0.7-0.9 cubic centimeters per gram.

6. The reactant of claim 1 in which the total surface area is at least 2 square meters per gram.

7. The reactant of claim 1 having a total surface area to weight ratio of about 0.9-4 square meters per gram.

8. A reactant for flue gas desulfurization comprising porous calcium oxide particles of highly voided skeletal structure of bulk density less than 1 gram per cubic centimeter and such that the particles have a total pore volume to weight ratio of about 0.7-0.9 cubic centimeters per gram, total surface area of at least 2 square meters per gram, median pore diameter by surface area of less than 2 micrometers, median pore diameter by pore volume greater than 0.8 micrometers, and in which at least about half of the pore volume resides in pores ranging from about 0.2 micrometers to about 20 micrometers in diameter.

* * * * *